O. E. OLESON.
PIPE COUPLING.
APPLICATION FILED SEPT. 18, 1908.

959,960.

Patented May 31, 1910.

Witnesses:
Fred W. Koehn.
Frank J. Thelen

Inventor
Olaf E. Oleson.
By Brown & Williams
Attorneys.

UNITED STATES PATENT OFFICE.

OLAF E. OLESON, OF CHICAGO, ILLINOIS.

PIPE-COUPLING.

959,960.   Specification of Letters Patent.   Patented May 31, 1910.

Application filed September 18, 1908. Serial No. 453,585.

*To all whom it may concern:*

Be it known that I, OLAF E. OLESON, a citizen of the United States, residing at Chicago, in the county of Cook and State of Illinois, have invented a certain new and useful Improvement in Pipe-Couplings, of which the following is a full, clear, concise, and exact description, reference being had to the accompanying drawings, forming a part of this specification.

My invention relates to pipe couplings, having for its particular object improved means for packing or sealing the coupling.

In some pipe couplings of the prior art, the parallel faces of coupling members are brought together, and a flat washer or gasket inserted between the surfaces and squeezed between the surfaces when the coupling is tightened. These washers or gaskets are usually of soft material, such as rubber, which soon becomes cut and which soon rots away, the coupling then becoming leaky. Metallic gaskets for packing members have also been used, but their shape and their application have always been such that the best results have not been accomplished. The gasket of my invention is in the form of a ring, preferably of circular cross-section, and of some ductile and preferably non-corrodible material, and the coupling heads are given a shape which will coöperate with the ring to compress the packing ring to give the best and most efficient packing qualities.

Figure 1:
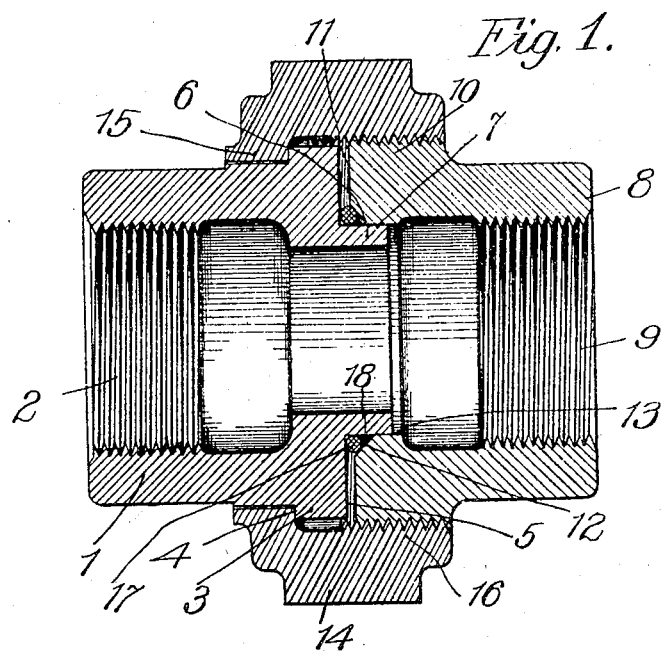
Figure 2:
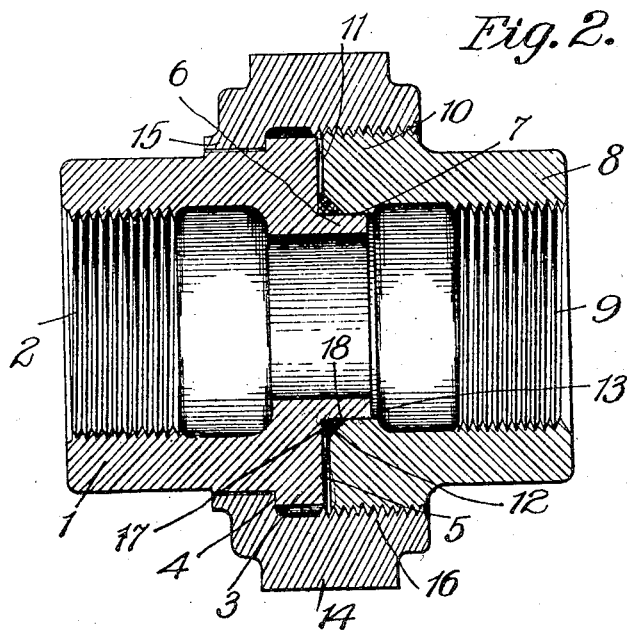

In the accompanying drawings, my invention is plainly illustrated, Figure 1 being a diametral sectional view of a coupling before the coupling members have been drawn tight, and Fig. 2 being a similar cross-sectional view of part of the coupling showing the members drawn up and the resulting disposition of the packing material.

The coupling head 1 is cylindrical, and has the internal threads 2 for receiving pipe. Surrounding the other end of the head 1 is a flange 3, forming a shoulder 4 and a face 5 in planes at right angles to the axis of the coupling. Extending axially from the inner edge of the face 5 is the annular flange 6, whose outer surface 7 is parallel to the axis of the coupling. The coupling head 8 has threads 9 for receiving piping, and at its inner edge has the threaded flange 10, whose face 11 is perpendicular to the coupling axis, and whose inner edge is cut away to leave the beveled surface 12, the inner surface 13 of the flange 10 being parallel to the coupling axis and of such diameter as to engage with a sliding fit over the surface 7 when the heads are brought together. The coupling ring 14 has the flange 15 for engaging the shoulder 4 on coupling head 1, and its other end 16 is threaded to receive the threaded flange 10.

As a means for packing and sealing the coupling members, I use a packing ring 17, preferably of circular cross section and which is composed of some ductile and preferably non-corrodible metal, such as copper. When the coupling heads are to be brought together, the coupling ring is placed about the flange 6, which is then engaged by the coupling head 8, and when the coupling ring 14 threads along the flange 10 to draw the coupling members together, the metal of the ring is compressed and forced into position, as shown in Fig. 2. When the members are brought together, the beveled surface 12 exerts two components of pressure against the packing ring. The axial component tends to force the material of the ring against the surface 5, and the radial component tends to force it against the surface 7. The metal is therefore forced and compressed into the V-shaped pocket 18 between the beveled surface 12 and the surface 7, which is where the greatest sealing strength should be in order to prevent leakage along the surface 7. If there is sufficient metal in the ring, part thereof will also be compressed outwardly between the faces 5 and 11 of the members. If the packing should become loose at any time, the coupling ring can be further tightened to bring the members closer together to more firmly compress the packing material into the wedge shaped pocket. The tendency to leak is also a great deal lessened by the engagement of the flange surfaces 7 and 13.

The particular advantage in my invention lies in the fact that the packing material when acted upon by the heads is driven into and compressed in a confined space, and the material is thus brought into intimate contact with the surfaces, and most efficient sealing or packing results. The sealing ring is automatically acted upon to compensate for expansion or contraction and to maintain or to form new sealing arrangements. If, for example, steam should get in between the flanges 6 and 10, it would cause pressure against the packing ring and would force this ring outwardly and more tightly into the space between the perpendicular faces 5 and 11 of the members.

I do not confine myself to the use of copper rings, as in some cases soft steel, copper bronze or other material is more desirable. The rings also are solid and unbroken. A split ring would not accomplish my purpose.

Having thus described my invention, I desire to secure the following claim by Letters Patent:

In a pipe coupling, the combination of a coupling head having a front coupling face in a plane perpendicular to the main axis of the pipe and having a forwardly extending flange with the outer surface parallel to the main axis of the pipe, the inner diameter of said flange being less than the inner diameter of the main portion of said head, a companion coupling head having a flange whose front face is perpendicular to the main axis of the pipe and having a forwardly extending flange with an inner surface parallel to the outer surface of the forwardly extending flange of the first coupling head and adapted to fit over the outer surface of said first coupling member, the inner diameter of said forwardly extending flange being less than the inner diameter of the main portion of said second coupling head, the front inner edge of the second coupling member being beveled away to form a slanting surface with which the perpendicular face of the first coupling member and the outer surface of the flange extending from said coupling member form a small triangular pocket, a ductile metallic packing ring of circular cross-section within said pocket, said ring filling only part of the space within said pocket, and coupling means for drawing the coupling heads together to decrease the volume of said pocket and to compress the ring in order to form a sealing medium between said coupling heads.

In witness whereof, I hereunto subscribe my name this 15th day of September, A. D. 1908.

OLAF E. OLESON.

Witnesses:
CHARLES J. SCHMIDT,
MAE A. OFFUTT.